(12) United States Patent
Morba et al.

(10) Patent No.: US 6,381,033 B1
(45) Date of Patent: Apr. 30, 2002

(54) METHOD AND APPARATUS FOR PRINTING DIGITAL IMAGES

(75) Inventors: Michael A. Morba, Rochester; Gregory R. Gingrich, North Chili, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/249,172

(22) Filed: Feb. 12, 1999

(51) Int. Cl.[7] .............................................. G06K 15/00
(52) U.S. Cl. ...................................................... 358/1.18
(58) Field of Search ................................ 358/1.15, 1.13, 358/1.1, 1.16, 1.14, 1.17, 442, 408, 1.18; 710/36, 37, 40, 41, 42, 43, 44, 45

(56) References Cited

U.S. PATENT DOCUMENTS 4,947,345 A * 8/1990 Paradise et al. ............ 358/442
5,970,224 A * 10/1999 Salgado et al. ............ 358/1.16

FOREIGN PATENT DOCUMENTS

| GB | 2 286 944 | 8/1995 | ................ 358/1.1 |
| WO | 93 07554 | 4/1993 | ................ 358/1.1 |

* cited by examiner

Primary Examiner—Arthur G. Evans
(74) Attorney, Agent, or Firm—Frank Pincelli

(57) ABSTRACT

A method and apparatus for printing customer image orders, each containing a plurality of images, onto a photosensitive media. A digital record of a customer image order containing a plurality of images in a predefined sequence is obtained. A printing sequence based on a predetermined criteria which is different from the sequence of the images as originally obtained is determined. The images are then printed onto a media in accordance with the new printing sequence.

29 Claims, 2 Drawing Sheets

METHOD AND APPARATUS FOR PRINTING DIGITAL IMAGES

FIELD OF THE INVENTION

The present invention relates generally to the field of printing, and more particularly, the field of printing digital images onto a photosensitive media.

BACKGROUND OF THE INVENTION

Traditional methods of printing images from a developed roll of film onto a photosensitive media comprises passing a strip of developed film through an exposure gate where the images on the film are exposed onto a photosensitive media, such as photographic paper. Each image on the film is exposed individually, one at a time, in the sequence dictated by the location of the image on the strip of film. Quite often many photofinishing labs promote and provide a second print of each of the images contained on the customer order. This is accomplished by printing each image twice successively until the entire customer image order has been processed. A disadvantage of this is that both sets of prints are packaged inter-mixed, thus requiring the customer to manually sort one set from the second set.

There has been suggested the providing of photographic prints using digital printing techniques. Such prior art digital printing devices may allow for the ability to preview and edit all images on a roll of developed film. This is typically accomplished using a low resolution scan of the images. Once the edits are performed, the negative film is rescanned at a higher scan resolution, one image at a time, and then sequentially exposed onto photographic paper. There is no buffering of the entire set of images of a customer image order at the higher resolution. This means that if more than one copy of the image is to be provided for the entire customer image order, all copies of the images must be either printed at the same time, or the entire roll rescanned at the higher resolution, and reprinted for each copy, both of which provide undesirable results for the consumer.

An advanced photographic system (APS) exists whereby customers can select for printing from one of several print format sizes. For example, a consumer may select PAN format size, which typically produces a 4R print size of approximately 4 inches×11.5 inches, an H format size (portrait), which typically produces a 4R print size of approximately 4 inches×7 inches, and a C format size (standard), which produces a 4R print size of approximately 4 inches×6 inches. Quite often, these images are interspersed on a single roll of photographic film. In current printing technologies each of these images are printed in the sequence they are provided on the film. Since these different format size images are interspersed on the film, the prints produced therefrom are also interspersed. This can cause difficulties in producing the prints and inconvenient for the customer to view and separate. One suggested solution in the prior art is the providing of an optical printer which allows the larger print sizes to be printed first and then the smaller print size until all the images have been printed. However, a serious disadvantage with this type of prior art optical printer is that the film is required to be rewound and repositioned at the exposure gate for each successive print size. This substantially reduces the speed and efficiency of the apparatus in addition to requiring additional wear and tear on the apparatus.

Thus, there is a need to provide an apparatus providing prints of different format sizes that can be easily sorted and packaged. There is also a need for providing printing sequences in a sequence which is beneficial to the consumer when the consumer receives the images.

SUMMARY OF THE INVENTION

In accordance with one aspect of the present invention there is provided a method for printing customer image orders, each containing a plurality of images, comprising the steps of:

a) obtaining a digital record of a customer image order containing a plurality of images in a predefined sequence;

b) arranging a printing sequence based on a predetermined criteria which is different from the predefined sequence; and c) printing the plurality of images onto a media in accordance with the printing sequence.

In accordance with another aspect of the present invention there is provided a method of printing customer image orders, each containing a plurality of digitally captured images, comprising;

a) scanning a strip of photosensitive material having a plurality of images of a customer image order;

b) producing a digital record of the plurality of images of the customer image order based on the scanning of the strip of the photosensitive material;

c) arranging a printing sequence based on a predetermined criteria which is different from the sequence produced by scanning the strip of photosensitive material; and d) printing the plurality of images on a medium in accordance with the printing sequence.

In accordance with yet another aspect of the present invention, there is provided an apparatus for printing customer image orders, each containing a plurality of images, comprising:

a scanner for scanning a strip of photosensitive material containing the plurality of images for the customer image order;

a memory for at least temporarily storing the plurality images obtained by the scanner;

means for creating a printing sequence based on a predetermined criteria which is different from the sequence produced by the scanner; and a digital printer for printing the plurality of images of the customer image order on the media in accordance with the printing sequence.

In still another aspect of the present invention there is provided a computer program product, comprising a computer readable storage medium having a computer program thereon, which when loaded into a computer, causes the computer to perform the following steps:

arranging a printing sequence of a plurality of images in a customer image order based on the predetermined criteria which is different from the sequence in which the plurality of images were originally provided; and providing the plurality of images to the printer for printing of the images in accordance with the printing sequence.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed, in particular, to elements forming part of, or in cooperation more directly with, the apparatus in accordance with the present invention, it being understood that elements not specifically shown or described may take various forms well known to those skilled in the art.

Figure 1:
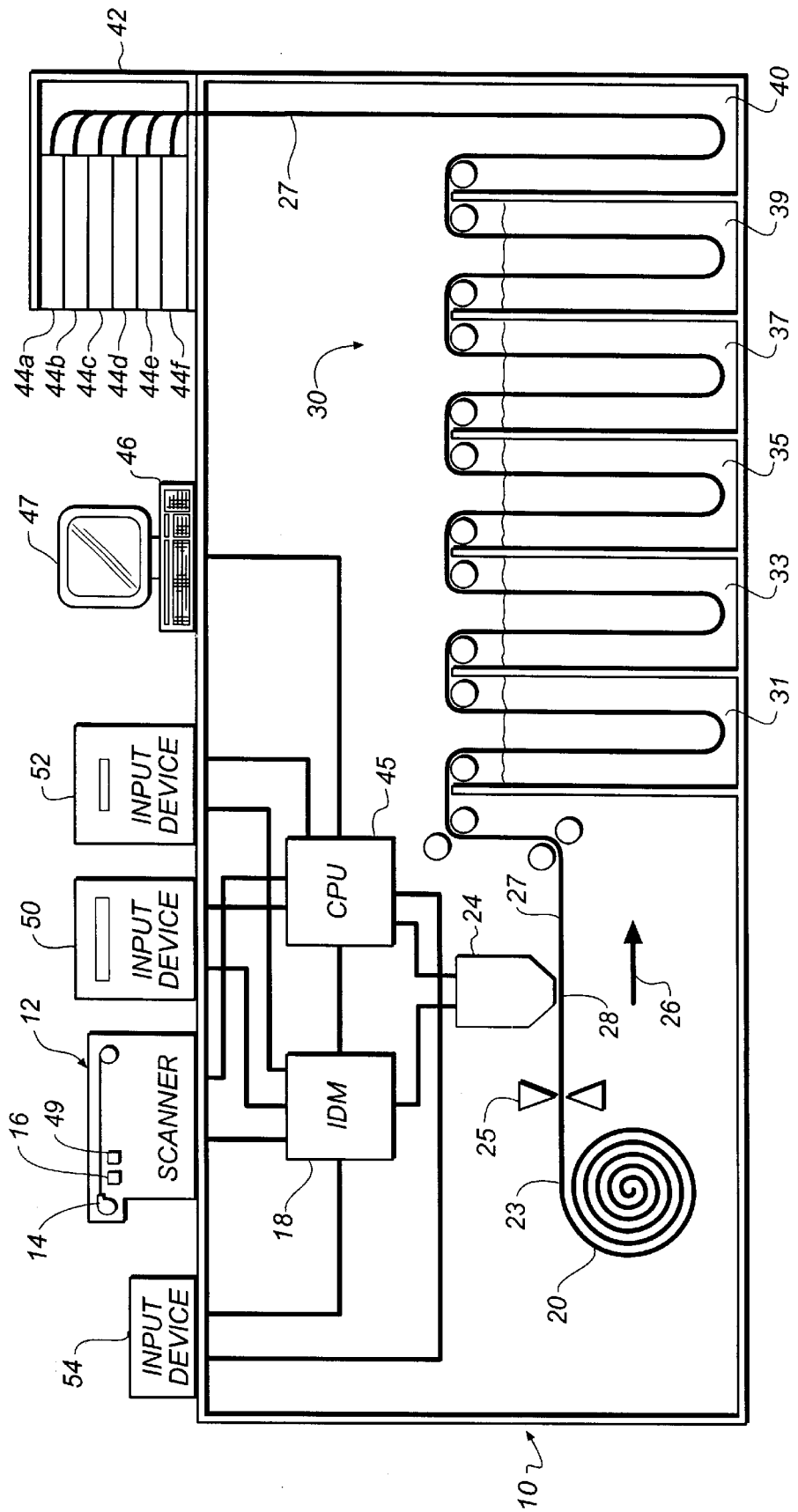
FIG. 1 is a schematic view of an apparatus made in accordance with the present invention.

Referring to FIG. 1, there is illustrated an apparatus 10, made in accordance with the present invention. In particular, the apparatus 10 is an apparatus designed to print digital images onto a photosensitive media (material). In particular, the apparatus 10 is of the type commonly referred to as a photographic minilab. As is typical with most minilabs, customer image orders are provided for printing of images onto a photosensitive media. A customer image order, for the purposes of the present invention, is a single roll of developed photographic film or digital record file of a single printing order containing a plurality of images thereon. In the particular embodiment illustrated, the apparatus 10 includes a scanner 12, which is designed to receive and scan a roll of developed film 14. The roll of developed film 14 is transported past sensor 16 in scanner 12 which scans the images on the film 14 so as to provide a digital record of the customer images. The scanner 12 scans at a resolution sufficient to provide the desired quality prints. The scanner should scan at a resolution of at least 500×700 pixels per inch, generally at least 1000×1500 pixels per inch. Preferably the scanner 12 scans at a high resolution equal to or greater than about 2000×3000 pixels per inch. The digital record of the image is forwarded to an image data manager (IDM) 18 wherein the images are manipulated as preprogrammed. In the embodiment illustrated, IDM 18 comprises a computer (microprocessor) used for manipulation of the digital images contained in the digital record file. The IDM 18 includes a memory for storing of the digital record of the customer image order.

The apparatus 10 further includes a supply roll 20 containing a web of photosensitive media 23, which in the present invention comprises photographic paper. A cutting mechanism 25 is provided for cutting the web of photosensitive media into individual cut sheets. The mechanism 25 may cut the web into sheets having any desired lengths. Appropriate transport mechanisms, not shown, are provided for advancing of the cut sheets in the direction indicated by arrow 26 along processing path 27 through apparatus 10. In particular, the cut sheets are transported from cutting mechanism 25 to an exposure gate 28 whereby a digital printer 24 exposes the individual images of the customer image order onto individual cut sheets, respectively, as they pass exposure gate 28. In the particular embodiment illustrated, the digital printer 24 is a MLVA (Micro Light Valve Array) printer which scans a light containing image data onto cut sheets as they move in the direction indicated by arrow 26 past exposure gate 28. Since printer 24 is a digital printer and the cutting mechanism 25 may cut the web of photosensitive media 23 into any desired length cut sheets, the images produced on cut sheets may be provided in a variety of different format sizes being constrained only by the printing capabilities of the printer 24 and width of the web of the photosensitive media 23. It is also to be understood that the printer 24 may be any appropriate digital printer, for example, a CRT printer, LED printer, LCD printer, laser printer, or other type of digital printer that can print onto a photosensitive media. In the embodiment illustrated, the web of photosensitive media 23 comprises photographic paper, however, the media may comprise other media capable of being printed on by a digital printer. In the embodiment illustrated, the web of photosensitive media is first cut into individual cut sheets prior to printing, the present invention is not so limited. The digital images may be first printed on the web of photosensitive media 23, which at some later time before or after processing, is to be cut into individual cut sheets forming individual prints, each print being representative of a print of a single customer image.

As is typical with minilabs, the apparatus 10 is further provided with a processing section 30 wherein the cut sheets, after leaving exposure gate 28, are passed therethrough for development as is customarily done in such devices. In the particular embodiment illustrated, the cut sheets are passed through a developer station 31 containing a developer solution, a bleach/fix station 33 containing a bleach/fix solution, a plurality of wash stations 35, 37 and 39 each containing a washing solution, and through a dryer section 40 for drying of the photosensitive media. The individual prints of the images are then forwarded to sorter 42 wherein the prints for each customer image order are collated into separate bins 44a–f, each bin preferably receiving an individual customer image order. It is to be understood that any desired number of bins 44 may be provided as appropriate for the apparatus 10 and sorted in accordance with any desired sorting criteria.

As is customary, a CPU (computer) 45, is provided for controlling operation of the apparatus 10 and its various components. A user/operator interface 46, which includes a viewing screen 47, is also provided for allowing an operator to enter instructions for operation of the apparatus 10 and monitor operation of the apparatus as is customarily done.

An appropriate computer printing program is provided for controlling operation of the IDM 18. The computer program is provided in a computer readable form, which when loaded into computer 45 will cause the apparatus to perform the required steps. In particular, the computer program is designed so that the IDM 18 will first obtain and store a complete customer image order prior to printing of the customer image order. The program is programmed with a predetermined criteria so that a printing sequence, different from the original sequence the images were obtained by scanner 12, is developed. The predetermined criteria may be determined in accordance with requests of the customer image order and preferences of the owner and/or operator of the apparatus 10. It is to be understood that any desired printing criteria may be programmed.

In addition to obtaining the digital record of the images, the scanner may also obtain additional information. For example, the scanner may be provided with a second sensor 49 for automatically reading instructional information that may be present on the film which may provide information relating to print size, number of prints and/or print format. This information can be used by the IDM 18 for processing of the order. Printing and/or other processing instructions can also be manually entered into apparatus 10 through interface 46. Thus, the IDM 18 can rearrange the sequence of printing to take into account specific customer requests and provide a sequence that also best utilizes the printing capabilities and sorting capabilities of the apparatus. For example, the largest print format may be printed first, followed by the next largest size prints, and is continued until all of the images in the customer image order are printed. Other criteria, such as packaging capabilities or requirements of the minilab, can also be used to determine the printing sequence. In certain situations, it may be desirable to print the smallest prints first followed by the next larger print until the entire order is complete.

In order to better understand the present invention and a brief description of its use, an operation will now be discussed. A first customer image order, which typically comprises a roll of developed film, is received by the retail and/or wholesale establishment. If the film has not already been developed, the film is developed in any desired manner, as is well known to those skilled in the art. Thereafter, any specific customer request for the customer image order, if any, is programmed into the apparatus 10 by the operator using the operator interface 46. For example, should the order specify a second set of prints or different size print is desired, this information will be fed into the apparatus. Alternatively, the operator and the owner of the minilab 10 may be running a special wherein certain type prints, such as providing a full second set, are automatically provided for each customer image order received. Once the customer order information is obtained and/or fed into the apparatus 10, CPU 45 provides the appropriate information to IDM 18 as required. The developed roll of film is passed through scanner 12 whereby the images are obtained and digitized in a predefined sequence forming a digital record of the images in the predefined sequence which is forwarded onto IDM 18. Any special printing instructions on the film can also be obtained by scanner 12. Should the customer image order contain a request for images of more than one format, for example, PAN, portrait, or standard format size prints, this information is also forwarded to the IDM 18. Once all of the images of the customer image order are stored into the memory of the IDM 18, then the predetermined printing criteria for printing is applied in accordance with any instructions preprogrammed or obtained from the order, thereby generating a new printing sequence. The images in the new printing sequence are sent on to printer 24. For example, but not by way of limitation, if a second set of images of the entire customer image order is requested, the first set of images are sent to the printer which are then sequentially printed onto the cut sheets followed by the second complete set. The cutting mechanism 25 cuts the web of photosensitive media 23 in the appropriate number and length required for the cut sheets upon which the images for the customer image order are to be printed. The cut sheets with the images printed thereon are then passed through the processing section 30 for development and drying. After exiting the dryer 40 the cut sheets are fed into the sorter 42 wherein the prints for each customer image order are separated into the appropriate bin 44. In particular, a single customer image order may be placed in bin 44a. However, since the images have been printed in new printing sequence, the first set of images are automatically separated from the second set of images thereby eliminating any further collation or separation by the operator or consumer. The images then can be manually or automatically placed into an envelope, or other packaging, which is then returned to the customer. If desired, the first set of prints can be separated into a different bin from the second set of images thereby providing separate and discrete individual packaging for each of the sets, further enhancing the ease by which a customer can easily distinguish between the first and second set.

It is to be understood that any desired predetermined criteria may be utilized, for example, a second printing criteria can be specifically designed to suit the needs of the operator or requirements of the printer. In particular, the largest format images can be printed first, followed by the next larger format size images and continued until all of the images for the customer image order have been printed. Thus, after the entire order has been sent to the IDM 18, should the customer image order contain an order for more than one format size print, the images are sent to printer 24 in accordance with the predetermined criteria. For example, the largest prints, PAN prints, would be sent to printer 24, whereby all the PAN size prints are printed first, and then the next size which would be portrait, and followed by the standard size prints. If a second set of prints are also to be provided, the first set can be separated from the second set in the manner previously discussed. The images on the web of photosensitive media 23 are sent through the processing section 30 and forwarded on to the sorter 42. However, since the larger prints were printed first, the prints are automatically sorted by size. No further work is required by the consumer or operator in sorting by size. In the above printing criteria the largest size prints were printed first, however, any desired printing sequence may be used. Depending on how a customer image order is to be packaged, it may be desired to print the smallest prints first and progressively printing the next larger size. Also, depending on the capabilities of the apparatus, different size prints for a single customer image order may be placed in a number of bins equal to the number of different size prints for that order. This allows for separately packaging different size prints of a single customer image order which can then be packaged in a larger package.

It is, of course, understood that any other desired printing criteria may be provided as desired by the customer or the operator. For example, but not by way of limitation, the roll sequence for each of the different format sizes may be maintained during printing. Additionally, the printing criteria may provide for placement of an index print at any desired point in the customer order, or provide for the placement of promotional prints, comparison prints, or any other material at any location within or adjacent the customer image order.

In the embodiments discussed above, the images for printing are obtained by scanning a developed roll of photosensitive film. However, the present invention is not so limited. As illustrated in FIG. 1, image data and customer image order may be obtained from a variety of different sources whereby a customer image order may be submitted for printing, including providing of information of where the printed images are to be forwarded. For example, image input devices 50, 52, 54 may be provided, wherein input device 50 may provide the images supplied on a CD, device 52 can be used to obtain images provided on computer disk, and a communication modem 54 may be provided to receive images over the internet, or from any other source that can forward digital images. Other digital input devices, such as a digital camera may also be used.

In the embodiment illustrated, the apparatus 10 does the printing, however, the present invention is not so limited. For example, the printing sequence determined by the printing criteria can be forwarded onto a different device for storage, printing and/or display. For example, the IDM 18 may forward the images in the new sequence through modem 54 to a customer or other device for providing and/or storing images.

Figure 2:
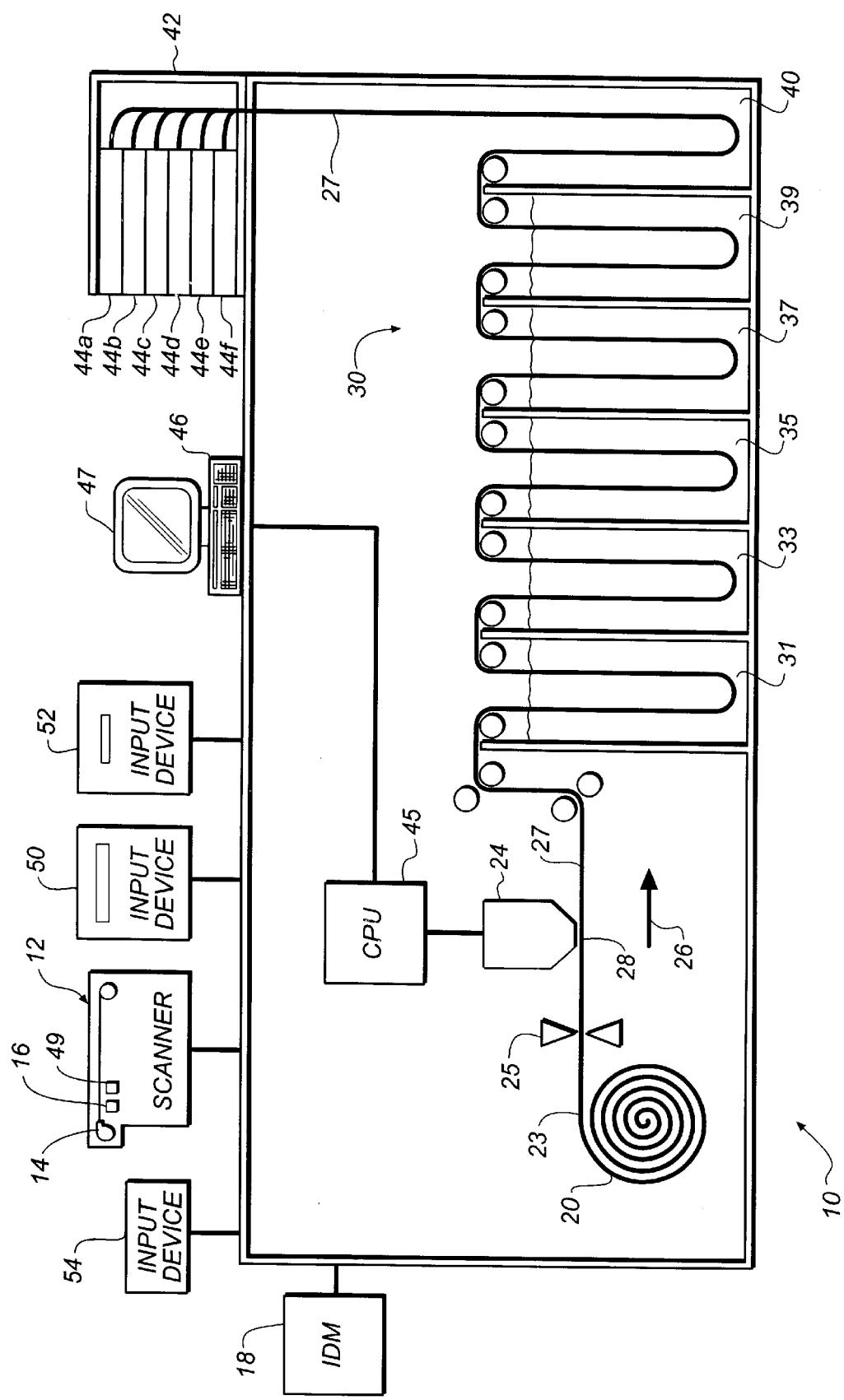
FIG. 2 is a schematic view of a modified system made in accordance with the present invention.

In the embodiment illustrated in FIG. 1, the individual components are illustrated as a single apparatus 10. However, the present invention is not so limited. Referring to FIG. 2, there is illustrated a modified form of the present invention, like numerals indicating like parts and operation as previously discussed. In this embodiment, the scanner 12, IDM 18 and devices 50, 52, 54 are shown as separate individual components from the apparatus 10, which is used for printing of the images onto a photosensitive media. The operation and function of all the elements are the same except that individual elements are discrete elements that can be separate from each other and connected by appropriate communication lines as is well known to those of ordinary skill in the art.

In the embodiment illustrated, the processing of the photosensitive media is done by the apparatus 10. However, the present invention is not so limited. For example, the images may be printed on the web of photosensitive material 23 and forwarded in web form to a processor wherein the images are developed after which the developed web is forwarded onto to a finishing station wherein the web is cut into individual prints and sorted by customer image order.

It is to be understood that various other changes and modifications may be made without departing from the scope of the present invention. The present invention being defined by the following claims.

| PARTS LIST | |
|---|---|
| 10 | apparatus |
| 12 | scanner |
| 14 | developed film |
| 16 | sensor |
| 18 | image data manager (IDM) |
| 20 | supply roll |
| 23 | photosensitive media |
| 24 | digital printer |
| 25 | cutting mechanism |
| 26 | arrow |
| 27 | processing path |
| 28 | exposure gate |
| 30 | processing section |
| 31 | developer station |
| 33 | bleach/fix station |
| 35 | wash station |
| 37 | wash station |
| 39 | wash station |
| 40 | dryer section |
| 42 | sorter |
| 44a–f | bins |
| 45 | CPU (computer) |
| 46 | user/operator interface |
| 47 | viewing screen |
| 49 | sensor |
| 50 | input device |
| 52 | input device |
| 54 | input device |

What is claimed is:

1. A method for printing customer image orders, each containing a plurality of images, comprising the steps of:
   a) obtaining a digital record of an entire customer image order containing a plurality of images in a predefined sequence;
   b) arranging a printing sequence based on a predetermined criteria which is different from the predefined sequence; and
   c) printing said plurality of images onto a media in accordance with said printing sequence.

2. A method according to claim 1 wherein said plurality of images have more than one format size, said predetermined criteria comprises printing said customer order images in a sequence according to a predetermined format size relationship.

3. A method according to claim 2 wherein said predetermined format relationship comprises printing the largest format size image first and then printing the next larger format size image until all the images have been printed.

4. A method according to claim 1 wherein said plurality of images comprise at least two different image format sizes selected from the group comprising PAN format, standard format and portrait format.

5. A method according to claim 4 wherein said predetermined criteria comprises printing the images having PAN format size first, then the portrait format size, then the standard format size.

6. A method according to claim 1 wherein said predetermined criteria comprises printing a first and second set of said images onto a web of photosensitive material in sequence wherein said first set is separate from said second set.

7. A method according to claim 6 wherein said images on said web of photosensitive material are being cut and packaged in accordance with said printing sequence.

8. A method according to claim 1 wherein said printing sequence comprises printing more than one print of at least one image.

9. A method according to claim 1 wherein said printing criteria takes into account the printing capabilities of the printer.

10. A method of printing customer image orders, each containing a plurality of digitally captured images, comprising;
    a) scanning a strip of photosensitive material having a plurality of images of a customer image order;
    b) producing a digital record of said plurality of images of said customer image order based on said scanning of said strip of said photosensitive material;
    c) arranging a printing sequence based on a predetermined criteria which is different from the sequence produced by said scanning said strip of photosensitive material prior to printing; and
    d) printing said plurality images on a medium in accordance with said printing sequence.

11. A method according to claim 10 wherein said scanning of said strip of photosensitive material is conducted at a high resolution.

12. A method according to claim 11 wherein said high resolution comprises scanning said image at a scan resolution of about 500×700 pixels per inch.

13. A method according to claim 10 wherein said plurality of images of said at least one customer order comprises more than one image format, said predetermined criteria comprises printing said images in a sequence according to a predefined format relationship.

14. A method according to claim 13 wherein said format relationship comprises printing the largest image format size first, then successively printing the next smaller image format size until all the images of said customer order have been printed.

15. A method according to claim 13 wherein said format relationship comprises printing the smallest image format size first, then successively printing the next larger image format size until all the images of said customer order have been printed.

16. A method according to claim 14 wherein said image formats comprises PAN, portrait and standard formats.

17. A method according to claim 13 wherein said PAN format images are printed first followed by portrait format images and then standard format images.

18. A method according to claim 10 wherein said media comprises a photosensitive media.

19. A method according to claim 18 wherein said media comprises photographic paper.

20. A method according to claim 10 wherein said media comprises a web of photosensitive material.

21. A method according to claim 10 wherein the print made of said images of said customer order are cut and packaged in accordance with said predetermined criteria.

22. An apparatus for printing customer image orders, each containing a plurality of images, comprising:

a scanner for scanning a strip of photosensitive material containing said plurality of images for said customer image order;

a memory for at least temporarily storing said plurality of images obtained by said scanner;

means for creating a printing sequence based on a predetermined criteria which is different from the sequence produced by said scanner; and a digital printer for printing said plurality of images of said customer image order on the media in accordance with said printing sequence.

23. An apparatus according to claim 22 wherein said scanner is a high resolution scanner.

24. An apparatus according to claim 22 wherein said high resolution scanner scans an image at a scan rate of about 1000×1500 pixels per inch.

25. An apparatus according to claim 22 wherein said high resolution scanner scans an image at a scan rate equal to or greater than about 2000×3000 pixels per inch.

26. An apparatus according to claim 22 wherein said predetermined criteria comprises printing said images in a descending size order beginning first with printing the largest print image, then the next smaller print until all of the images are printed.

27. An apparatus according to claim 22 wherein said predetermined criteria comprises printing said image in an ascending size order beginning first with the smallest print image, then the next larger size print until all of the images are printed.

28. An apparatus according to claim 22 wherein said predetermined criteria comprises printing a first set of customer images and then printing a second set in the same printing sequence.

29. A computer program product, comprising a computer readable storage medium having a computer program thereon which when loaded into a computer, causes the computer to perform the following steps:

arranging a printing sequence of a plurality of images in a customer image order based on the predetermined criteria which is different from the sequence in which the plurality of images were originally provided; and providing said plurality of images to the printer for printing of the images in accordance with said printing sequence.

* * * * *